(12) United States Patent
Sambhy et al.

(10) Patent No.: US 12,386,289 B2
(45) Date of Patent: Aug. 12, 2025

(54) RELEASE FLUID ADDITIVE

(71) Applicant: Xerox Corporation, Norwalk, CT (US)

(72) Inventors: Varun Sambhy, Pittsford, NY (US); Eliud Robles-Flores, Rochester, NY (US); Douglas Allen Gutberlet, Ontario, NY (US); Paul F. Sawicki, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 657 days.

(21) Appl. No.: 17/472,833

(22) Filed: Sep. 13, 2021

(65) Prior Publication Data

US 2023/0102385 A1  Mar. 30, 2023

(51) Int. Cl.
*G03G 15/20*  (2006.01)
*C08L 83/04*  (2006.01)

(52) U.S. Cl.
CPC .......... *G03G 15/2025* (2013.01); *C08L 83/04* (2013.01); *G03G 15/2053* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 4,185,140 A | * | 1/1980 | Strella | G03G 15/2025 |
| | | | | 428/420 |
| 5,589,120 A | * | 12/1996 | Khan | A61L 29/14 |
| | | | | 264/130 |
| 6,102,898 A | * | 8/2000 | Khan | A61L 29/143 |
| | | | | 428/447 |
| 7,208,258 B2 | | 4/2007 | Gervasi et al. | |
| 9,713,604 B2 | | 7/2017 | Dreher | |
| 10,214,662 B1 | | 2/2019 | Sambhy et al. | |
| 2007/0292798 A1 | | 12/2007 | Kamite et al. | |
| 2019/0317438 A1 | * | 10/2019 | Sambhy | G03G 15/2025 |

FOREIGN PATENT DOCUMENTS

| | | |
|---|---|---|
| EP | 0 698 463 A2 | 2/1996 |
| EP | 1 270 674 A1 | 1/2003 |
| EP | 1513027 A1 | 3/2005 |

OTHER PUBLICATIONS

Extended European Search Report issued Jan. 18, 2023 in corresponding European Application No. 22191878.2, 8 pages.

* cited by examiner

*Primary Examiner* — Mark F. Huff
*Assistant Examiner* — Charles Collins Sullivan, IV
(74) *Attorney, Agent, or Firm* — MH2 Technology Law Group LLP

(57) ABSTRACT

Disclosed herein is a release fluid, a fuser member and an image forming apparatus. The release fluid includes an amino functional silicone fluid, a non-functional silicone fluid; and vitamin E.

19 Claims, 3 Drawing Sheets

RELEASE FLUID ADDITIVE

BACKGROUND

Field of Use

The disclosure herein is directed to release fluids or agents that are useful in release coating in toner-based technologies.

Background

In electrostatographic reproducing apparatuses, including digital, image on image, and contact electrostatic printing apparatuses, a light image of an original to be copied is typically recorded in the form of an electrostatic latent image upon a photosensitive member and the latent image is subsequently rendered visible by the application of electroscopic thermoplastic resin particles and pigment particles, or toner. The residual toner image can be either fixed directly upon the photosensitive member or transferred from the member to another support, such as a sheet of plain paper with subsequent fixing or fusing.

In order to fix or fuse the toner onto a support member permanently by heat, it is necessary to elevate the temperature of the toner to a point at which the constituents of the toner coalesce and become tacky. This heating action causes the toner to flow to some extent into the fibers or pores of the support member. Thereafter, as the toner cools, solidification of the toner causes the toner to be bonded firmly to the support member.

Typically, the thermoplastic resin particles are fused, commonly referred to as toner, to the substrate by heating to a temperature of from about 90° C. to about 200° C. or higher, depending on the softening range of the particular resin used in the toner. It may be undesirable, however, to increase the temperature of the substrate substantially higher than about 250° C. because the substrate may discolor or scorch or ignite at such elevated temperatures, particularly when the substrate is paper.

The fuser roll is a replacement part. Replacing a fuser roll adds significant run cost to an electrostatographic machine.

Several antioxidants can be added to release fluids to prevent or mitigate degradation e.g. typical motor oil has several antioxidants to improve oil stability and engine parts oxidation/corrosion. However, most of these additives are toxic and not cleared for use for prints that may come into human contact. Some of the common food approved additives like BHT (butylated hydroxytoluene) and vitamin C are solids not soluble in silicone oil and not stable at fusing temperatures.

It would be desirable to have release fluids that provide long life to replacement parts in and electrostaographic machine.

SUMMARY

According to various embodiments, there is provided a release fluid including an amino functional silicone fluid, a non-functional silicone fluid, and vitamin E.

A further aspect described herein a fuser member that includes a substrate, an outer layer covering the substrate, and a release coating on the outer layer. The release coating includes a release fluid for coating the outer layer, the release fluid further including an antioxidant having a structure:

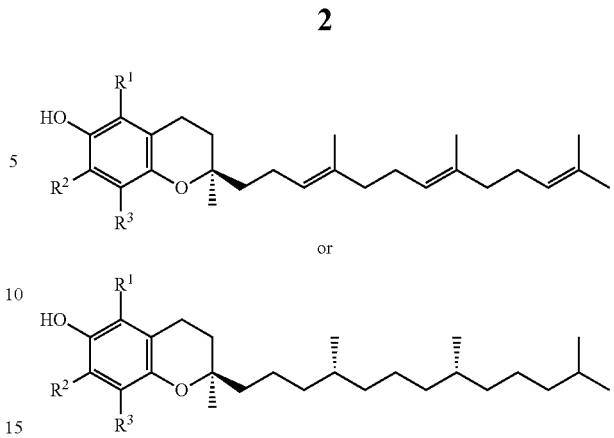

where $R_1$, $R_2$ and $R_3$ are $CH_3$, or hydrogen.

A further aspect described herein is an image forming apparatus. The image forming apparatus includes a photoreceptor having a photosensitive layer, a charging device which charges the photoreceptor, and an exposure device which exposes the charged photoreceptor to light, thereby forming an electrostatic latent image on a surface of the photoreceptor. The image forming apparatus includes developer stations for developing a toner image on a surface of the photoreceptor and at least one transfer device for transferring the toner image to a recording medium. The image forming apparatus includes a fuser station for fixing the toner images transferred to the recording medium, onto the recording medium by heating the recording medium, thereby forming a fused image on the recording medium. The fuser station includes a fuser member, a pressure member and a release fluid in combination with the fuser member, wherein the release fluid includes an amino functional silicone fluid, a non-functional silicone fluid and an antioxidant having a structure:

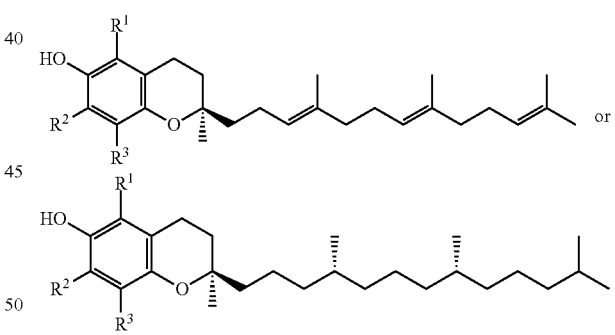

where $R_1$, $R_2$ and $R_3$ are $CH_3$, or hydrogen.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
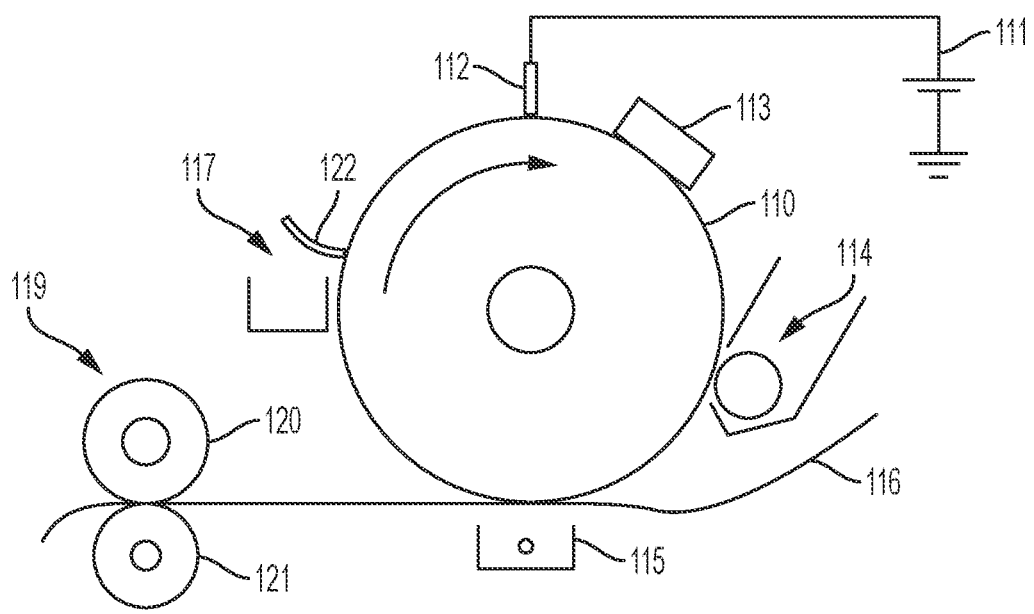
FIG. 1 is a schematic illustration of an image apparatus in accordance with the present disclosure.

It should be noted that some details of the FIGS. have been simplified and are drawn to facilitate understanding of the embodiments rather than to maintain strict structural accuracy, detail, and scale.

DETAILED DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. $-1$, $-2$, $-3$, $-10$, $-20$, $-30$, etc.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

Referring to FIG. 1, in a typical electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 110 is charged on its surface by means of a charger 112 to which a voltage has been supplied from power supply 111. The photoreceptor 110 is then imagewise exposed to light from an optical system or an image input apparatus 113, such as a laser and light emitting diode, to form an electrostatic latent image on the photoreceptor 110. Generally, the electrostatic latent image is developed by bringing a developer mixture from a developer station 114 into contact herewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 116 by transfer apparatus 115, which can be performed by pressure transfer or electrostatic transfer. Alternatively, the developed image can be transferred to an intermediate transfer member, or bias transfer member, and subsequently transferred to a copy sheet 116. Examples of copy substrates include paper, transparency material such as polyester, polycarbonate, or the like, cloth, wood, or any other desired material upon which the finished image will be situated.

After the transfer of the developed image is completed, copy sheet 116 advances to fusing station 119, depicted in FIG. 1 as fuser roll 120 and pressure roll 121 (although any other fusing member components such as fuser belt in contact with a pressure roll, fuser roll in contact with pressure belt, and the like, are suitable for use with the present apparatus), where the developed image is fused to copy sheet 116 by passing copy sheet 116 between the fusing and pressure members, thereby forming a permanent image. Alternatively, transfer and fusing can be effected by a transfix application. Photoreceptor 110, subsequent to transfer, advances to cleaning station 117, where any toner left on photoreceptor 110 is cleaned therefrom by use of a blade 122 (as shown in FIG. 1), brush, or other cleaning apparatus. Alternatively, transfer and fusing can be effected by a transfix application.

One of the main failure modes for the fuser is toner contamination buildup on the fuser roll. The fuser roll topcoat may be Viton, a low surface energy anti-adhesive fluoropolymer. A release agent management system (RAM) system applies a metered amount of release fluid to the fuser roll to aid clean release of toner patch from the fuser roll. The fusing conditions are quite aggressive, high temperature and pressure, oxygen from the environment, steam from water in paper, environmental humidity or aggressive chemicals from the toner. All these factors put significant oxidative degradation stress on the Viton polymer. Oxidative degradation of the Viton surface results in the low surface energy anti-stick property to become a high surface energy high adhesion property. In addition, the silicone oil in the RAM is itself prone to oxidative degradation and can degrade over time resulting in reduced release properties. Once the Viton surface or the release fluid have been oxidatively degraded, toner can stick to the roll surface and contamination builds up leading to print defects and fuser roll failure. Hence, any mechanism that can slow oxidative degradation of the Viton or the release fluid can potentially improve fuser roll life significantly. An antioxidant prevents oxidation of the release fluid and the Viton topcoat of the fuser roll.

Disclosed herein is release fluid formulation containing vitamin E antioxidant.

Vitamin E antioxidant reduces oxidative degradation of the fuser release fluid and fuser roll Viton topcoat. The disclosed release fluid can be used in existing release fluid delivery systems without modifications.

The release fluid includes three components. Vitamin E, an amino functional silicone oil and a non-functional silicone oil as described in more detail below.

Component 1 of the release fluid includes Vitamin E. Vitamin E is a group of eight fat soluble compounds that include four tocopherols and four tocotrienols. Vitamin E exists in eight different forms, four tocopherols and four tocotrienols. All feature a chromane ring, with a hydroxyl group that can donate a hydrogen atom to reduce free radicals and a hydrophobic side chain which allows for penetration into biological membranes.

The general structure of the tocotrienols is shown below.

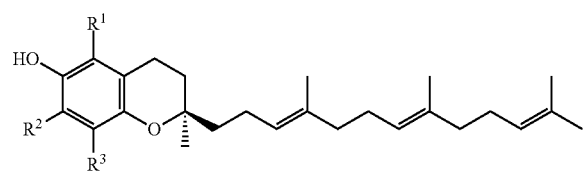

where $R_1$, $R_2$ and $R_3$ are $CH_3$, or hydrogen (Formula I(a)).

The general structure of the tocopherols is shown below.

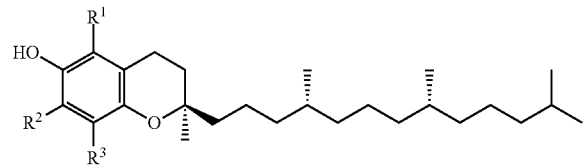

where $R_1$, $R_2$ and $R_3$ are $CH_3$, or hydrogen (Formula I(b)).

The molecules that contribute activity are four tocopherols and four tocotrienols, within each group of four identified by the prefixes alpha-($\alpha$-), beta-($\beta$-), gamma-($\gamma$-), and delta-($\delta$-) For alpha($\alpha$)-tocopherol each of the three "R" sites has a methyl group ($CH_3$) attached. For beta($\beta$)-tocopherol: $R_1$=methyl group, $R_2$=H, $R_3$=methyl group. For gamma($\gamma$)-tocopherol: $R_1$=H, $R_2$=methyl group, $R_3$=methyl group. For delta($\delta$)-tocopherol: $R_1$=H, $R_2$=H, $R_3$=methyl group. The same configurations exist for the tocotrienols, except that the hydrophobic side chain of the tocotrienols has three carbon-carbon double bonds whereas the tocopherols have a saturated side chain.

Vitamin E described herein could be a mixture of one or more tocopherols and tocotrienols known to those skilled in the art. Vitamin E described herein could be from natural sources or manmade sources.

Several antioxidants may be added to release fluids to improve their degradation e.g. typical motor oil has several antioxidants to improve oil stability and engine parts oxidation/corrosion. However, most of these additives are toxic and not cleared for use for prints that may come in contact with humans. Some of the common food approved additives like BHT (Butylated hydroxytoluene) and vitamin C are solids not soluble in silicone oil and not stable at fusing temperatures.

Another benefit of using Vitamin E as an antioxidant additive in polydimethyl silicone (PDMS) fluids is its safety. Vitamin E is very safe for human contact applications and has no know detrimental environmental effects. This is especially important as toner prints made using the fusing system described herein typically end up with a thin layer of silicone release fluid and come in contact with humans.

Vitamin E has a decomposition temp of 500° C. and is expected to be stable at fusing temperatures of approximately 160-200° C. Therefore, the release fluid with Vitamin E additive is expected to be stable in the machine over its lifetime.

Examples of suitable amino functional silicone fluids (component 2) include those having pendant amino groups, such as those having the following structure as represented by Formula II:

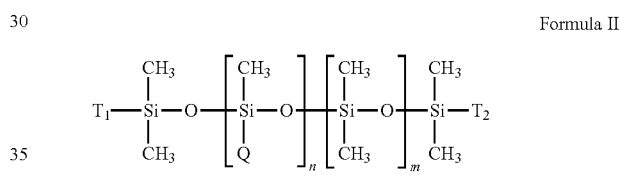

Formula II where Q represents —$R_1$—X, wherein $R_1$ represents an alkyl group having from about 1 to about 10 carbons. X represents —$NH_2$ or —$NHR_2NH_2$ with $R_2$ having the same description as $R_1$. In Formula II, n is an integer from 1 to 50, m is an integer from 10 to 5,000. $T_1$ and $T_2$ are methyl (—$CH_3$), or hydroxyl (—OH) group. The structure in Formula II can be a block or a random copolymer. In embodiments in Formula II, n is from about 1 to about 50, or from about 1 to about 25 or from about 1 to about 10; m is from about 10 to about 5,000, or from 50 to 1000 or from 100 to 1000. In embodiments, n is from about 1 to about 10 providing pendant groups that are mono-amino, di-amino, tri-amino, tetra-amino, penta-amino, hexa-amino, hepta-amino, octa-amino, nona-amino, deca-amino, and the like. The amount of amino functional silicone fluid in the release fluid is about 1.0 weight percent to about 20.0 weight percent base on the weight of the release fluid. In embodiments, X represents —$NH_2$, and in other embodiments, $R_1$ is propyl. In embodiments, X represents —$NHR_2NH_2$, and in embodiments, $R_2$ is propyl.

In embodiments, the Formula II has a molecular weight (Mw) of from about 1,000 to about 100,000, or from about 1,000 to about 10,000 daltons and a viscosity of from about 10 to about 1,500 centipoise, or from about 50 to about 1,000 centipoise.

Examples of suitable non-functional silicone release fluids (component 3) include those having the following Formula III:

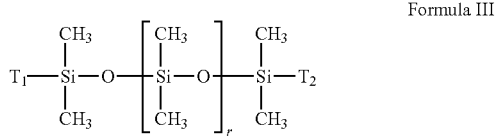

Formula III

In Formula III, r is an integer from 10 to 5,000. $T_1$ and $T_2$ are methyl (—$CH_3$), or hydroxyl (—OH). The structure in Formula II can be a block or a random copolymer.

In embodiments in Formula III, r is from about 10 to about 5,000, or from 50 to 1000 or from 100 to 1000.

In embodiments, Formula III has a molecular weight (Mw) of from about 1,000 to about 100,000, or from about 1,000 to about 10,000 daltons and a viscosity of from about 10 to about 1,500 centipoise, or from about 50 to about 1,000 centipoise.

In embodiments, the blended release fluid includes vitamin E. The amount of vitamin E (component 1), either (Formula I(a) or Formula I(b)) in the release fluid blend is from 0.5 weight percent to about 10.0 weight percent of the weight of the blended release fluid. In embodiments, the amount of Formula II (component 2) is from 1 weight percent to 20 weight percent of the weight of the blended release fluid. In embodiments, the amount of Formula III (component 3) is from 69.5 weight percent to 98.5 weight percent of the weight release fluid blend.

In embodiments, the release fluid blend of Formula I(a) or Formula I(b) and Formula II and Formula III has a viscosity of from about 50 to about 1500 centipoise or from about 60 to about 500 centipoise or from about 70 to about 400 centipoise. The silicone release fluid can have terminal silanol Si—OH groups during synthesis of the silicone release fluid.

Figure 2:
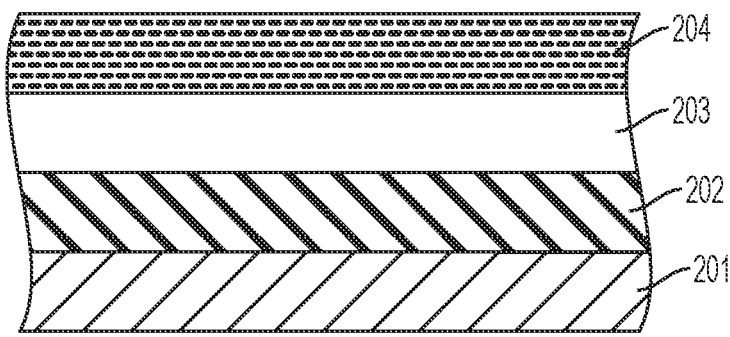
FIG. 2 is an enlarged, side view of an embodiment of a fuser member, showing a fuser member with a substrate, intermediate layer, outer layer, and release coating layer in accordance with the present disclosure.

FIG. 2 is an enlarged schematic view of an embodiment of a fuser member, demonstrating the various possible layers. As shown in FIG. 2, substrate 201 includes an optional intermediate layer 202. Intermediate layer 202 can be, for example, a rubber such as silicone rubber or other suitable rubber material. On the intermediate layer 202 is positioned an outer layer 203. Positioned on the outer layer 203 is an outermost release fluid or agent 204, described in more detail below.

The outer layer 203 may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. Examples of the outer surface 203 of the fuser system member 200 include fluoroelastomers or hydrofluoroelastomers.

Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are selected from the class of: 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, and are known commercially under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromo-perfluorobutene-1,3-bromoper-fluoro-propene-1,1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS®, a poly(propylenetetra-fluoroethylene), and FLUOREL II® (LII900), a poly(propylene-tetrafluoroethylene-vinylidenefluoride), both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in the outer layer solution, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers. In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the outer layer, in order to provide anchoring sites for the functional groups of the fuser agent. Examples of suitable fillers include inorganic fillers such as silicas or a metal-containing filler, such as a metal, metal alloy, metal oxide, metal salt, or other metal compound. The general classes of metals which can be used include those metals of Groups 1b, 2a, 2b, 3a, 3b, 4a, 4b, 5a, 5b, 6b, 7b, 8, and the rare earth elements of the Periodic Table. For example, the filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers of aluminum oxide, cupric oxide, reinforcing and non-reinforcing calcined alumina and tabular alumina, respectively, along with silicas. Other fillers include various forms of carbon, such as carbon nanotubes, graphene or other forms of carbon; and doped metal oxides such as antimony-doped tin oxide, indium-doped tin oxide, and the like. The filler may include just one filler or a mixture of fillers.

The thickness of the outer layer 203 of the fuser member 200 herein is from about 10 to about 250 micrometers, or from about 5 to about 100 micrometers, or from about 1 to about 50 micrometers.

Optional intermediate adhesive layers and/or intermediate polymer or elastomer layers 202 may be applied to achieve desired properties and performance objectives of the embodiments herein. The intermediate layer 202 may be present between the substrate 201 and the layer 203. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); and the like. Another specific example is Dow Corning Sylgard 182. An adhesive intermediate layer may be selected from, for example, epoxy resins and polysiloxanes.

There may also be provided an adhesive layer between the substrate 201 and the intermediate layer 202. There may also be an adhesive layer between the intermediate layer and the outer layer. In the absence of an intermediate layer, the outer layer may be bonded to the substrate via an adhesive layer. The thickness of the intermediate layer is from about 0.5 to about 20 mm, or from about 1 to about 10 mm, or from about 3 to about 5 mm.

In embodiments, the release fluid described herein is provided onto the outer layer of the fuser member via a delivery mechanism such as a delivery roll. The delivery roll is partially immersed in a sump, which houses the release fluid or agent.

The release fluids or agents are renewable in that the release fluid or agent is housed in a holding sump and provided to the fuser roll when needed, optionally by way of a release fluid donor roll in an amount of from about 0.1 to about 20 mg/copy, or from about 1 to about 12 mg/copy. The system by which fuser release fluid is provided to the fuser roll via a holding sump and, optionally, a donor roll that is well known. The release fluid may be present on the fuser member surface in a continuous or semi-continuous phase. The release fluid in the form of a film is in a continuous phase and continuously covers the fuser member.

Figure 3:
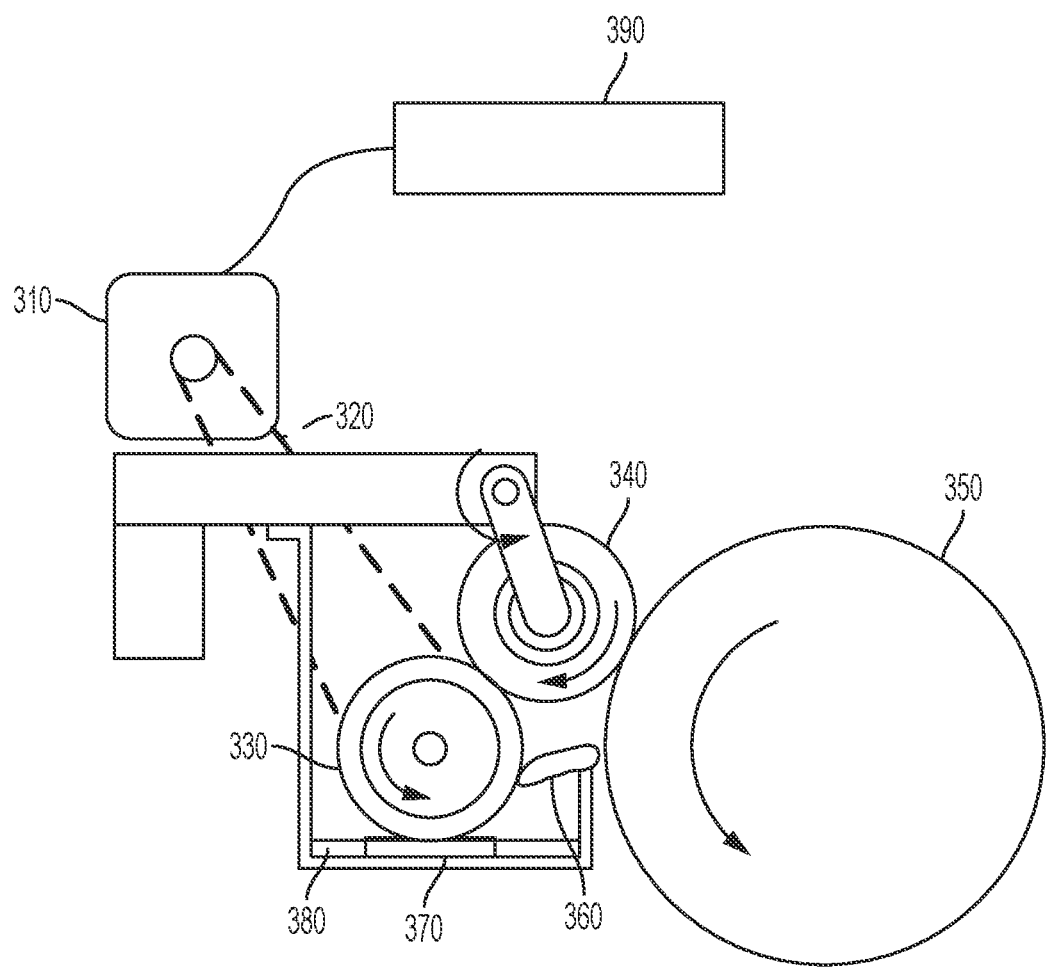
FIG. 3 is schematic illustration of a release fluid apparatus for providing release fluid to a fuser member in accordance with the present disclosure.

FIG. 3 illustrates an embodiment of a variable speed meter (VSM) for delivering release fluid. FIG. 3 shows a drive motor 310 attached by a belt 320 to a metering roll 330 such that drive motor 310 turns metering roll 330. A controller 390 controls drive motor 310. Metering roll 330 picks up release fluid 380 from a release fluid pan 370. Release fluid 380 adheres to the surface of metering roll 330, is spread in a layer of desired thickness by a metering blade 360, and is then transferred to a donor roll 340. The release fluid 380 is then transferred from donor roll 340 to a fuser roll (or belt) 350. Fuser roll 350 can correspond to the top roll 120 in fusing station 119 shown in FIG. 1, which is the roll that contacts the unfused toner on the printed sheet. As a result, the apparatus shown in FIG. 3 applies a uniform layer of release fluid or agent to the fuser roll in order to reduce adhesion of toner to the fuser roll surface.

The term "drive" or "drive motor" can apply to any electromechanical arrangement capable of providing a desired rotational speed, and could include, for example, simply an electrical motor, such as a brush, brushless, or stepper motor, with or without accompanying transmission mechanisms. Also, any roll, including a fuser roll, donor roll, or metering roll, can, in alternate embodiments, be in the form of a belt entrained around two or more rollers.

A traditional release agent management system (RAM) applies release fluid to the fuser roll at an idle release fluid rate (or no release fluid) when a print job is not running, and at a steady state running release fluid rate when a print job is running. These systems change from the idle release fluid rate to the steady state running oil rate when a print job is started.

The blended release fluid described herein includes a blend of vitamin E (Formula I(a) or Formula I(b) an amino functional silicone fluid (Formula II) and a non-functional silicone fluid (Formula III).

Specific embodiments will now be described in detail. These examples are intended to be illustrative, and not limited to the materials, conditions, or process parameters set forth in these embodiments. All parts are percentages by solid weight unless otherwise indicated.

Examples

A release fluid was made as follows—1000 g of a non-functional silicone release fluids (Formula III) and 250 g of amine functional silicone release fluids (Formula II) were mixed in a beaker using an overhead stirrer. 50 g of Vitamin E (α-Tocopherol obtained from Sigma Aldrich Product #258024) were slowly added to the silicone fluid mixture in the beaker while stirring.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:
1. A release fluid comprising:
an amino functional silicone fluid;
a non-functional silicone fluid; and
an antioxidant represented by:

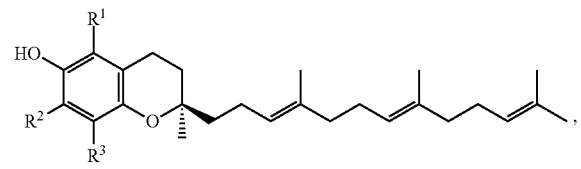

where $R_1$, $R_2$ and $R_3$ are each independently selected from $CH_3$, and hydrogen; and
wherein the release fluid is stable at a temperature of from about 160° C. to about 200° C.; and
wherein an amount of antioxidant is from about 1.5 weight percent to about 10.0 weight percent based on the weight of the release fluid.
2. The release fluid of claim 1, wherein the amino functional silicone fluid is represented by:

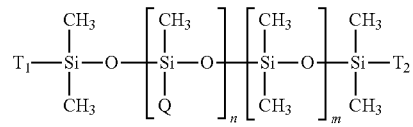

wherein Q represents $-R_1\text{-}X$, wherein $R_1$ represents an alkyl group having from about 1 to about 10 carbons, X represents $-NH_2$ or $-NHR_2NH_2$ with $R_2$ having the same description as $R_1$, n is an integer from 1 to 50, m is an integer from 10 to 5,000, wherein $T_1$ and $T_2$ are each independently selected from methyl (—CH3), and hydroxyl (—OH).

3. The release fluid according to claim 2, wherein the X represents an aminopropyl amine functional group.

4. The release fluid of claim 1, wherein the non-functional silicone fluid is represented by:

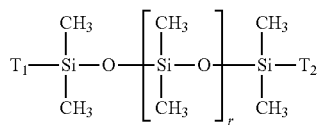

wherein r is an integer from 10 to 5,000, wherein $T_1$ and $T_2$ are each independently selected from methyl (—CH3), and hydroxyl (—OH).

5. The release fluid of claim 1, wherein the antioxidant further comprises a compound represented by:

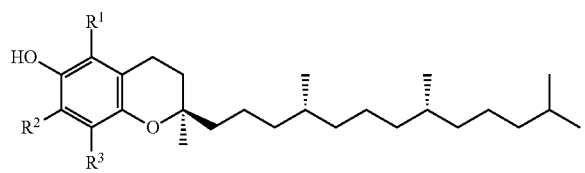

where $R_1$, $R_2$ and $R_3$ are each independently selected from $CH_3$, and hydrogen.

6. The release fluid according to claim 1, wherein the release fluid comprises a viscosity of from about 50 to about 1500 centipoise.

7. A fuser member comprising: a substrate; an outer layer covering the substrate; and a release coating on the outer layer comprising a release fluid for coating the outer layer, the release fluid further comprising an antioxidant having a structure:

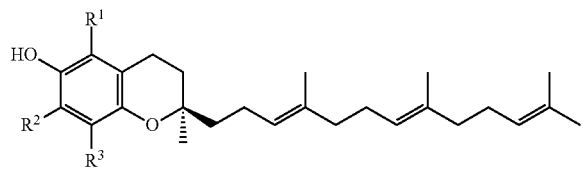

where $R_1$, $R_2$ and $R_3$ are each independently selected from $CH_3$, and hydrogen;
wherein the release fluid is stable at a temperature of from about 160° C. to about 200° C.; and
wherein an amount of the antioxidant is from about 1.5 weight percent to about 10.0 weight percent based on the weight of the release fluid.

8. The fuser member of claim 7, wherein the fuser member substrate is in the form of a belt or a roller.

9. The fuser member of claim 7, further comprising an intermediate layer disposed between the substrate and the outer layer.

10. The fuser member of claim 9, wherein the intermediate layer comprises a silicone rubber.

11. The fuser member according to claim 7, wherein the release fluid comprises a viscosity of from about 50 to about 1500 centipoise.

12. An image forming apparatus comprising:
a photoreceptor having a photosensitive layer; a charging device which charges the photoreceptor; an exposure device which exposes the charged photoreceptor to light, thereby forming an electrostatic latent image on a surface of the photoreceptor;
a developer stations for developing a toner image on a surface of the photoreceptor;
at least one transfer device for transferring the toner image to a recording medium;
a fuser station for fixing the toner images transferred to the recording medium, onto the recording medium by heating the recording medium, thereby forming a fused image on the recording medium;
wherein the fuser station comprises: a fuser member, a pressure member and a release fluid in combination with said fuser member, wherein said release fluid comprises an amino functional fluid, a non-functional silicone fluid and an antioxidant having a structure:

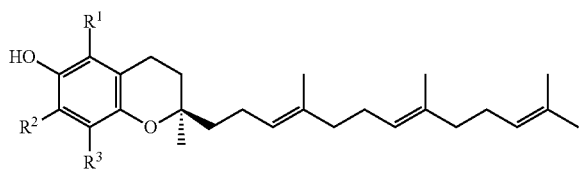

where $R_1$, $R_2$ and $R_3$ are each independently selected from $CH_3$, and hydrogen;
wherein the release fluid is stable at a temperature of from about 160° C. to about 200° C.; and
wherein an amount of the antioxidant is from about 1.5 weight percent to about 10.0 weight percent based on the weight of the release fluid.

13. The image forming apparatus of claim 12, wherein the amino silicone functional fluid is represented by:

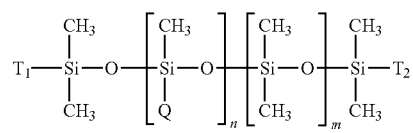

wherein Q represents —$R_1$-X, wherein $R_1$ represents an alkyl group having from about 1 to about 10 carbons, X represents —$NH_2$ or —$NHR_2NH_2$ with $R_2$ having the same description as $R_1$, n is an integer from 1 to 50, m is an integer from 10 to 5,000, wherein the non-functional silicone fluid is represented by:

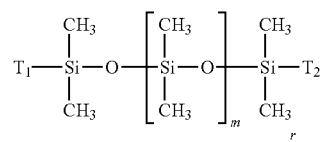

wherein r is an integer from 10 to 5,000, wherein $T_1$ and $T_2$ are each independently selected from methyl (—CH3), and hydroxyl (—OH).

14. The image forming apparatus according to claim 13, wherein X represents an aminopropyl amine functional group.

15. The image forming apparatus of claim 12, wherein the fuser member comprises: a substrate; an outer layer covering the substrate; and the release fluid on the outer layer.

16. The image forming apparatus of claim 15, wherein the outer layer is selected from the group consisting of: a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers.

17. The image forming apparatus according to claim 15, further comprising an intermediate layer disposed between the substrate and the outer layer.

18. The image forming apparatus according to claim 12, wherein a viscosity of the release fluid is from about 50 to about 1500 centipoise.

19. The image forming apparatus of claim 12, wherein the fuser station includes a substrate in the form of a belt or a roller.

* * * * *